United States Patent [19]

Balnpied

[11] Patent Number: 5,405,882

[45] Date of Patent: Apr. 11, 1995

[54] METHOD OF FOAMING ASPHALT AND PRODUCTS PRODUCED THEREBY

[75] Inventor: Robert H. Balnpied, Meridian, Miss.

[73] Assignee: Atlas Roofing Corporation, Meridian, Miss.

[21] Appl. No.: 991,191

[22] Filed: Dec. 16, 1992

[51] Int. Cl.⁶ .............................................. C08J 9/00
[52] U.S. Cl. .................................. 521/83; 521/151; 264/51; 428/304.4; 428/305.5; 428/489
[58] Field of Search .................. 428/304.4, 489; 106/284.03; 264/51; 521/151, 83

[56] References Cited

U.S. PATENT DOCUMENTS

| | | | |
|---|---|---|---|
| 4,456,705 | 6/1984 | McCarthy | 521/83 |
| 4,524,156 | 6/1985 | Cogliano | 521/83 |
| 4,590,123 | 5/1986 | Hashimoto et al. | 428/316.6 |
| 4,692,473 | 9/1987 | Wright et al. | 521/72 |
| 4,925,494 | 5/1990 | Hageman | 106/280 |
| 4,966,805 | 10/1990 | Ezawa et al. | 428/212 |

*Primary Examiner*—George F. Lesmes
*Assistant Examiner*—Blaine R. Copenheaver
*Attorney, Agent, or Firm*—Nixon & Vanderhye

[57] ABSTRACT

A process of foaming asphalt comprises mixing sodium hydrogen carbonate with asphalt melted to a liquid state. The mixing yields carbon dioxide and water. The carbon dioxide gas foams the molten asphalt, and the foaming is enhanced by the boiling of the water. The rate of addition of the sodium hydrogen carbonate, and the temperature of the asphalt, are controlled in accordance with the desired specific gravity of the resultant foamed asphalt. The sodium hydrogen carbonate is added at a rate in a range of from about 2.0% by weight to about 6.0% by weight. The asphalt is melted at a temperature in a range from about 212° F. to about 500° F. The foamed asphalt is used, inter alia, by depositing the foamed asphalt on a substrate.

5 Claims, No Drawings

METHOD OF FOAMING ASPHALT AND PRODUCTS PRODUCED THEREBY

BACKGROUND

1. Field of Invention

This invention pertains to a process of foaming or frothing asphalt, and products made by the process.

2. Prior Art and Other Considerations

Foamed asphalt can be used to create three-dimensional profiles in shingles, and to reduce the density of protective (e.g., moisture resistant) coatings or boards.

Heretofore, asphalt was frothed, or foamed, by the mechanical addition of inert gasses, generally air. Historically the addition of inert gases has required expensive equipment and costly processing methods. For example, U.S. Pat. No. 4,399,186 teaches the use of mechanically mixing an inert gas with molten asphalt either by utilizing high pressure pumps or high shear mixers.

Accordingly, it is an object of the present invention to provide an efficient and economical process for frothing, or foaming, asphalt.

SUMMARY

A process of foaming asphalt comprises mixing sodium hydrogen carbonate with asphalt melted to a liquid state. The mixing yields carbon dioxide and water. The carbon dioxide gas foams the molten asphalt, and the foaming is enhanced by the boiling of the water. The rate of addition of the sodium hydrogen carbonate, and the temperature of the asphalt, are controlled in accordance with the desired specific gravity of the resultant foamed asphalt. The sodium hydrogen carbonate is added at a rate in a range of from about 2.0% by weight to about 6.0% by weight. The asphalt is melted at a temperature in a range from about 212° F. to about 500° F. The foamed asphalt is used, inter alia, by depositing the foamed asphalt on a substrate.

DETAILED DESCRIPTION OF THE INVENTION

Asphalt contains naturally occurring organic acids. This invention utilizes the chemical reaction of sodium hydrogen carbonate, or sodium bicarbonate (NaHCO) with those acids to create carbon dioxide gas and water, both of which create a frothing or foaming of the asphalt.

A reaction of the invention is carried out at temperatures sufficient to melt the asphalt to a liquid state (e.g., in excess of 212° F.) and at temperatures below 500° F. A lower softening point asphalt (such as "Flux" having a 100° F. to 120° F. softening point) should be used for processing at temperatures below 250° F. Showing the asphaltic acids as "H-Asphalt", the reaction is as follows:

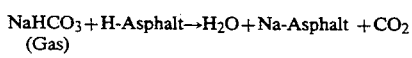

$$NaHCO_3 + \text{H-Asphalt} \rightarrow H_2O + \text{Na-Asphalt} + CO_2 \text{(Gas)}$$

The water generated from this reaction is instantly boiled to water vapor, further enhancing the asphaltic foaming process.

FOAMED ASPHALT EXAMPLE 1

A one quart paint can is preheated to 200° F. in a heating mantle. Coating grade asphalt with a Softening Point of 225° F. and a Penetration of 15 is melted in a larger container. The preheated can is tared on digital scales, and 300.0 grams of molten asphalt are weighed into the can. This prepared sample is then controlled at 350° F. in the heating mantle.

A mixer blade and mixer speed capable of creating a vortex is utilized to blend the molten asphalt. When the asphalt reaches 350° F., the can is removed from the heating mantle, and 11.0 grams of NaHCO3 are added at once to the vortex of molten asphalt. The mixing cannot exceed about 10 seconds, at which time the contents of the can begin to expand. The can, which is held with vice-grip type pliers, is removed from the mixing blade and tilted toward the desired substrate material for application thereto.

The specific gravity of the foamed asphalt of Example 1 is 0.31 grams per cubic centimeter at 25° C.

FOAMED ASPHALT EXAMPLE 2

A 300 gram asphalt sample is prepared as in Foamed Asphalt Example 1. The heating mantle temperature is maintained at 200° F. instead of being raised to 350° F. When the 11.0 grams of sodium bicarbonate is added, very little frothing takes place. The specific gravity of this asphalt sample is 0.65 gr/cc at 25° C.

FOAMED ASPHALT EXAMPLE 3

A preparation of asphalt is made as in Foamed Asphalt Example 1. The heating mantle temperature is raised and maintained at 475° F. instead of 350° F. When 11.0 gr of sodium bicarbonate is added, the frothing takes place so fast it cannot be controlled. No specific gravity determination was made of this asphalt sample.

FOAMED ASPHALT EXAMPLE 4

A preparation of asphalt is made as in Foamed Asphalt Example 1. The heating mantle temperature is maintained at 350° F. The sodium bicarbonate addition is made at 15.0 grams instead of 11.0 grams. When the sodium bicarbonate is added, the frothing takes place rapidly, but is controllable. Because the resultant cell size was too large, no specific gravity determination was made on this asphalt sample.

For the invention there is thus a preferred range of sodium bicarbonate addition rates, as well as a preferred range of asphalt temperatures. The processing temperature must be adjusted to accommodate the softening point of the particular asphalt being processed. Additionally, the rate of frothing, and the ultimate density of foamed asphalt, can be easily and accurately controlled by the amount of sodium bicarbonate added and the temperature at which it is added.

For industrial applications, the asphalt can be fed to a continuous melting, metering, mixing, and extrusion die casting operation. Alternatively, the frothed asphalt can be deposited upon a continuously moving web, or strand, of substrate material. The resultant composite asphaltic material can be further molded, formed, shaped, adhered, or deposited prior to cooling and cutting. Further, a batch molding system can be used for some processes.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A process of foaming asphalt comprising the steps of:
   melting asphalt to a liquid state at temperatures in a range from 212° F. to 500° F.; and
   adding sodium hydrogen carbonate to the melted asphalt to produce a foamed asphalt, the sodium hydrogen carbonate being added at a rate in a range of from about 2.0% by weight of the asphalt to about 6.0% by weight of the asphalt, the foamed asphalt being produced by the following reaction:

$$NaHCO_3 + H\text{-Asphalt} \rightarrow H_2 + Na\text{-Asphalt} + CO_2 \text{ (Gas)},$$

wherein H-Asphalt refers to a naturally occurring acid in asphalt.

2. The process of claim 1, further comprising depositing the foamed asphalt on a substrate.

3. The process of claim 1, wherein the rate of addition of the sodium hydrogen carbonate is controlled in accordance with the desired specific gravity of the resultant foamed asphalt.

4. The process of claim 1, wherein the temperature of the melted asphalt is controlled in accordance with the desired specific gravity of the resultant foamed asphalt.

5. A process of foaming asphalt by utilizing carbon dioxide and water vapor created by the chemical reaction of sodium hydrogen carbonate with the naturally occurring organic acids in molten asphalt at temperatures over 212° F. and below 500° F., wherein the foamed asphalt is produced by the following reaction:

$$NaHCO_3 + H\text{-Asphalt} \rightarrow H_2 + Na\text{-Asphalt} + CO_2 \text{ (Gas)},$$

wherein H-Asphalt refers to a naturally occurring acid in asphalt, and said sodium hydrogen carbonate being added to the molten asphalt at said temperatures at a rate in a range of from about 2.0% by weight of the asphalt to about 6.0% by weight of the asphalt.

* * * * *